United States Patent [19]
Eklund

[11] Patent Number: 5,312,072
[45] Date of Patent: May 17, 1994

[54] MINIMUM AREA SMOKE EVACUATION NOZZLE

[75] Inventor: Thor I. Eklund, Haddonfield, N.J.

[73] Assignee: The United States of America as represented by the Secretary of Transportation, Washington, D.C.

[21] Appl. No.: 564,514

[22] Filed: Aug. 9, 1990

[51] Int. Cl.⁵ ............................................. B64D 13/00
[52] U.S. Cl. .................................. 244/118.5; 244/129.2
[58] Field of Search .......................... 244/118.5, 129.2; 417/198, 196; 98/1.5

[56] References Cited

U.S. PATENT DOCUMENTS

| | | | |
|---|---|---|---|
| 284,962 | 9/1883 | Huston | 417/198 |
| 2,299,668 | 11/1942 | Webster | 244/118.5 |
| 2,980,033 | 4/1961 | Waddington et al. | 417/196 |
| 3,545,886 | 12/1970 | Chalom | 417/196 |
| 4,166,477 | 9/1979 | Duthion et al. | 137/561 R |
| 4,382,569 | 5/1983 | Boppe et al. | 244/199 |
| 4,552,325 | 11/1985 | Bruensicke | 244/129.2 |

OTHER PUBLICATIONS

Potter and Foss, *Fluid Mechanics*, 1982, pp. 490–497.
Elements of Gasdynamics, Chapter 5, Flow in Ducts and Wind Tunnels, Liepmann et al., May 1967, pp. 124–143.

*Primary Examiner*—Michael S. Huppert
*Assistant Examiner*—Anne E. Bidwell
*Attorney, Agent, or Firm*—O. M. Wildensteiner

[57] ABSTRACT

A smoke evacuation nozzle for an airplane having minimum diameter at the fuselage pressure hull exit for minimum structural integrity disruption. The nozzle is a converging-diverging nozzle which maintains sonic flow down to a very low altitude, thereby obtaining maximum airflow through it at all times. The throat is located at the point where the nozzle goes through the fuselage pressure hull so that the penetration through the fuselage pressure hull is minimal.

13 Claims, 3 Drawing Sheets

MINIMUM AREA SMOKE EVACUATION NOZZLE

STATEMENT OF GOVERNMENT INTEREST

The present invention may be made or used by or for the Government of the United States without the payment of any royalties thereon or therefor.

BACKGROUND

Smoke evacuation nozzles that have been proposed for use in aircraft are special nozzles that are normally closed; they would be opened in the event of fire, and used to remove the smoke from the passenger cabin. Studies have shown that such nozzles would be most effective if placed on or near the top of the fuselage along its centerline. As is true for most components of an airplane, the design of such a nozzle is a trade-off; in this case the trade-off is between flow capability on the one hand and weight on the other. A large nozzle will have a large flow capability, but will be heavy; and the large opening in the fuselage to accommodate it will require a considerable amount of reinforcing, which will cause its own weight penalty.

On the other hand, a small nozzle will not have the above weight penalty, but will not have the flow capability.

It is well known that a sonic orifice or nozzle flows the most fluid per unit area, and it is intuitive that such is desirable for a smoke evacuation nozzle given the above trade-off. However, the prior art has failed to produce such a nozzle that would remain effective at lower altitudes.

For example, the patent to Bruensicke, 4,552,325, shows a smoke evacuation nozzle that has a converging entrance section leading to the exit through the fuselage pressure hull. This nozzle will have sonic flow through its minimum area or throat only at higher altitudes where the ratio between the cabin pressure and the ambient pressure at a given altitude is greater than 2. At lower altitudes the flow will be subsonic, and hence the nozzle will not be as effective as a sonic nozzle.

OBJECTS OF THE PRESENT INVENTION

Accordingly, it is an object of the present invention to provide a smoke evacuation nozzle for an airplane which removes the maximum amount of smoke for its size.

It is a further object to provide such a nozzle which also requires the minimum diameter penetration through the aircraft fuselage pressure hull.

It is a further object to provide such a nozzle which maintains sonic flow at both high cruising and low descent altitudes.

It is a further object to provide such a nozzle which does not impose an additional aerodynamic drag penalty on the aircraft.

SUMMARY

Briefly, the present invention is a converging-diverging smoke evacuation nozzle in an airplane. The entrance to the converging portion is preferably flush with the passenger cabin ceiling and is covered by a grille. The throat is located where the nozzle penetrates the fuselage pressure hull, and the diverging portion is located within the dorsal fin and/or vertical stabilizer. When not in use the throat is closed by an aerodynamic plug in the converging portion. During operation, the flow through the nozzle can be controlled by movement of the aerodynamic plug to compensate for altitude changes.

DESCRIPTION OF THE PREFERRED EMBODIMENT

Figure 1:
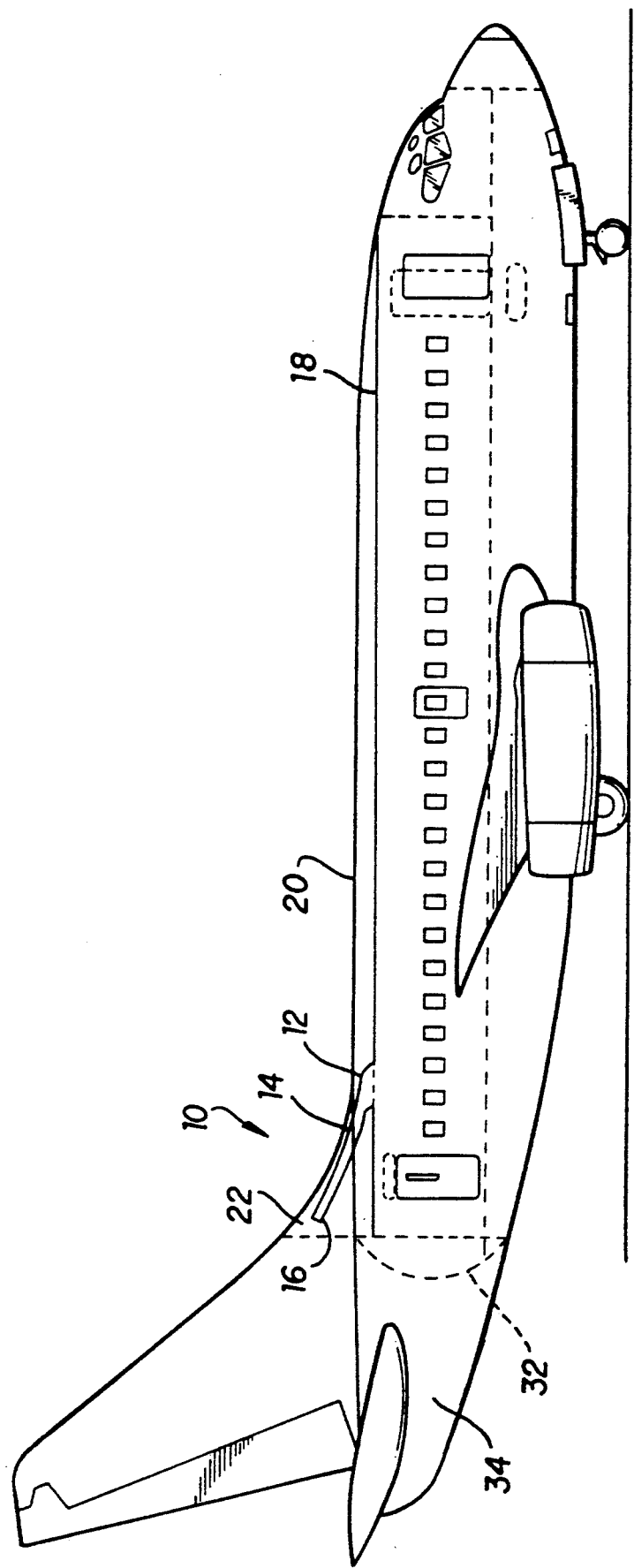
FIG. 1 shows the location of the smoke evacuation nozzle of the present invention in an airplane.

FIG. 1 shows nozzle 10 of the present invention installed in a representative airplane. Nozzle 10 comprises a converging portion 12, a throat 14, and a diverging portion 16. As can be seen, converging portion 12 is located in the space between passenger cabin ceiling 18 and fuselage pressure hull 20, and diverging portion 16 is located within dorsal fin 22. Throat 14 of nozzle 10 is located at the point where nozzle 10 goes through fuselage pressure hull 20, thereby requiring the minimum size penetration through fuselage pressure hull 20.

The design of nozzle 10 is well known in the art; it is a smoothly contoured converging-diverging nozzle with no disruptions to the flow on its interior walls. It can be a simple conical nozzle, or it can be designed by the method of characteristics or any other well known nozzle design criteria.

The entrance to nozzle 10 at the cabin ceiling should be covered by grille 24 (see FIGS. 2 and 3), both for esthetic reasons and to prevent debris from being sucked into nozzle 10 and clogging it during operation. When not in operation, flow through nozzle 10 is preferably prevented by an aerodynamic plug 26 in converging portion 12 just upstream of throat 14 and which seats in throat 14. Such a closure is the smallest, hence lightest and most easily operated. During operation of nozzle 10 plug 26 can be moved upstream and downstream by plug actuator 28 to vary the effective area of throat 14 as the altitude of the airplane changes. Plug actuator 28 can be of any design, but is preferably automatic in operation rather than manual (but may provide for emergency manual operation as a safety measure).

Figure 2:
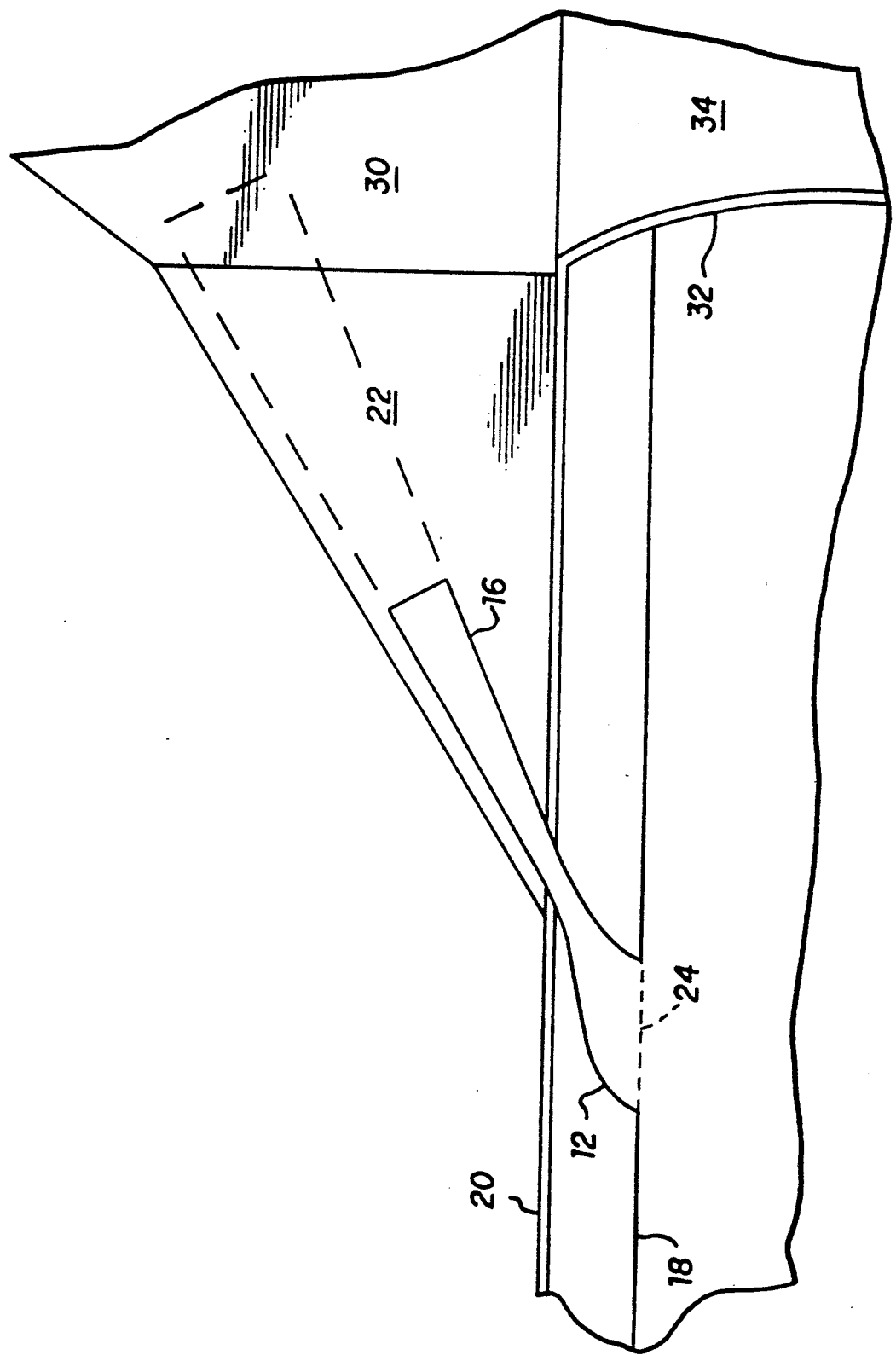
FIG. 2 shows a more detailed view of the nozzle in the dorsal fin of a representative airplane.

FIG. 2 shows a representative vertical stabilizer 30 and dorsal fin or fin root fillet 22 with diverging portion 16 shown in it; the dimensions are approximately to scale. The actual placement of diverging portion 16 will be a function of its size and the size of the dorsal fin and vertical stabilizer of a given aircraft. A short diverging portion will be lighter in weight, hence may extend only into the dorsal fin; however, a longer diverging portion may be required in order to get the desired performance. Additionally, not all aircraft have adequately large dorsal fins, in which case diverging portion 16 will extend instead into the vertical stabilizer as shown in the dotted lines. Alternatively, diverging portion 16 could be extended through aft pressure bulkhead 32 into tailcone 34 as shown in FIG. 3 since the tailcone of an airplane has sufficient room to accommodate the diverging portion of a smoke evacuation nozzle.

Placing diverging portion 16 in dorsal fin 22 and/or vertical stabilizer 30 will require cutting away the central parts of some of the internal members. However, making diverging portion 16 out of fairly rigid material and incorporating it as part of the internal structure of dorsal fin 22 or vertical stabilizer 30, whichever it passes into, may be sufficient to restore any lost structural strength.

The flow from nozzle 10 exits into the interior of dorsal fin 22, vertical stabilizer 30, or tailcone 34, each of which enclosed spaces is at approximately ambient pressure for that altitude. However, if there is a fire on board and nozzle 10 is put into use, the pressure in the enclosed space will undoubtedly rise; therefore it may be necessary to put some exhaust louvers on the outside skin of dorsal fin 22, vertical stabilizer 30, or tailcone 34 to help remove the smoke and keep the back pressure from rising.

Figure 3:
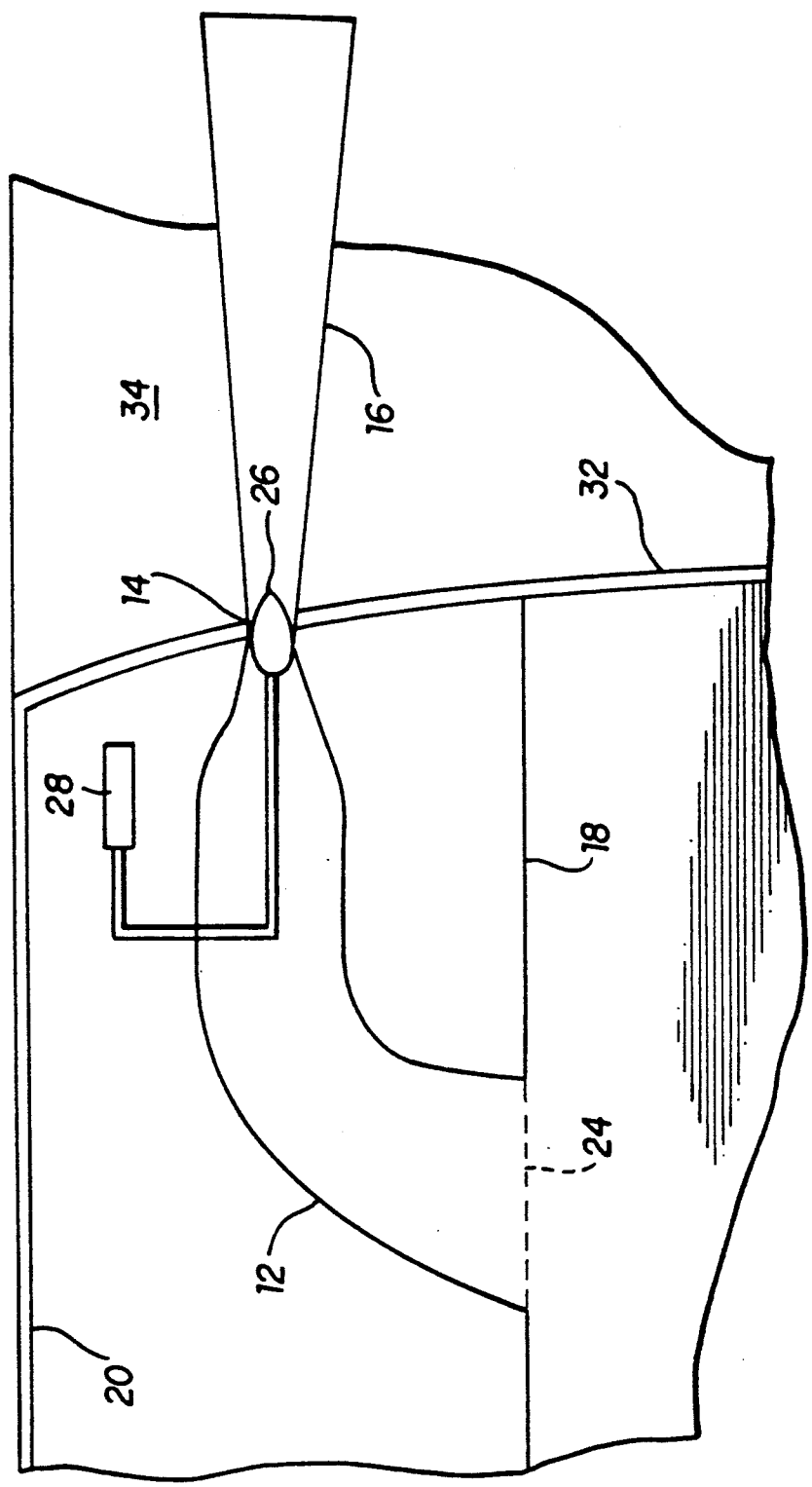
FIG. 3 shows the details of the smoke evacuation nozzle of the present invention, with the diverging portion of the nozzle extending into the tailcone of an airplane.

FIG. 3 shows a representative smoke evacuation nozzle for installation at any point in the pressure hull. Throat 14 is located in aft pressure bulkhead 32. Diverging portion 16 is located in tailcone 34 and converging portion 12 is located between passenger cabin ceiling 18 and fuselage pressure hull 20. Grille 24 covers the entrance to converging portion 12 which leads to throat 14. Aerodynamic plug 26 seats in throat 14 to form an airtight seal when nozzle 10 is not in use. Aerodynamic plug 26 is translated fore and aft by actuator 28 which can be of any design to fit the physical constraints of a particular installation.

Although the prior art smoke evacuation nozzles such as in the patent to Bruensicke will have sonic flow through them at higher altitudes because of the lower outside ambient pressure, the flow will not remain sonic as the airplane descends through lower altitudes. Sonic flow is established when the pressure upstream of the throat is approximately twice the outside ambient pressure (for air). When this nozzle pressure ratio drops below 2, the flow becomes subsonic. Thus if a fire breaks out on board an airplane flying at 35,000 feet and the valve of Bruensicke is opened, the pressure ratio will be 3.45 (based on an 8.5 psi cabin pressure differential and the U.S. standard altitude pressure of 3.47 psia at 35,000 feet). As the plane descends, which is the prescribed response in case of a cabin fire, the pressure ratio will decrease due to the increasing outside ambient pressure. If the cabin altitude is set at 6,000 feet, the pressure ratio will fall below 2 when the plane descends below 23,000 feet, and the valve will not flow as much as it would if the flow were still sonic at the throat of the valve.

The present invention, since it has a diverging pressure-recovery section downstream of the throat, converts the velocity of the air downstream of the throat back to pressure. This means that the flow at the throat remains sonic at nozzle pressure ratios of less than 2. Tests on a well-designed and -manufactured venturi, which had a diverging pressure-recovery section downstream of its throat, showed that such a nozzle remained sonic at its throat down to an overall pressure ratio of 1.12. Although this cannot be correlated with a definite altitude since the pressure ratio across the fuselage pressure hull varies according to cabin pressure, it is an altitude about ½ that at which a nozzle such as that shown in Bruensicke stops being a sonic nozzle. Thus the present nozzle will remove smoke at its maximum rate for a far longer time than prior art nozzles. See also FIG. 5.23 and associated text of "The Dynamics and Thermodynamics of Compressible Fluid Flow", Volume I, by Ascher H. Shapiro, The Ronald Press Co., 1953.

With a converging-diverging nozzle with throat sonic flow capability down to an overall pressure ratio of 1.12, an airplane with cabin altitude set at 6,000 feet would continue to flow maximum air through the nozzle until it descended below 9,000 feet. Furthermore, if a fuselage pressure differential of 2.6 psi were maintained after the airplane descended below 10,000 feet, the smoke evacuation nozzle of the present invention could maintain sonic throat velocity all the way to sea level touchdown.

A specific example of an airplane for which the nozzle of the present invention could be put into the dorsal fin is the Boeing 737-100 or -200. These airplanes have dorsal fins that are much larger than needed for the installation of such a nozzle. Further, the dorsal fins are removable, which allows the diverging portion of the nozzle to be fairly easily integrated into the airplane's structure.

As is well known in the art, cabin air is supplied from "air packs" that take air from the engine compressors, condition it, and supply it to the cabin. At higher altitudes more of this air leaks out of the cabin than at lower altitudes due to the higher pressure differential at the higher altitudes. Therefore any smoke evacuation nozzle must have an adjustable opening since the proper flow area for lower altitudes will result in depressurization at higher altitudes. Therefore actuator 28 should be capable of settings that are intermediate fully open and fully closed.

Although the present invention is shown as a nozzle in the cabin ceiling that exhausts into the dorsal fin, vertical stabilizer, or tailcone, it could also be designed to exhaust smoke from the cabin floor or the cargo area into a wheel well or any other enclosed space that is exposed to outside ambient air pressure. As with the dorsal fin, vertical stabilizer, and tailcone, however, it may be necessary to add louvers to the wheel well covers or other enclosed space to remove the smoke from the wheel well or other enclosed space.

I claim:

1. In an airplane having a cabin ceiling, a fuselage pressure hull, and a vertical stabilizer, the improvement which comprises a smoke evacuation nozzle which maintains sonic flow at its throat at a nozzle pressure ratio of less than 2.

2. The smoke evacuation nozzle of claim 1 comprising a converging portion, a throat, and a diverging portion.

3. The smoke evacuation nozzle of claim 2 wherein said converging portion is located within said fuselage pressure hull, said diverging portion is located outside of said fuselage pressure hull, and said throat is located in said fuselage pressure hull.

4. The smoke evacuation nozzle of claim 3 wherein said diverging portion is located within said vertical stabilizer.

5. The smoke evacuation nozzle of claim 3 wherein said airplane futher includes a dorsal fin.

6. The smoke evacuation nozzle of claim 5 wherein said diverging portion is located within said dorsal fin.

7. The smoke evacuation nozzle of claim 6 wherein said diverging portion is located in said dorsal fin and said vertical stabilizer.

8. The smoke evacuation nozzle of claim 3 wherein said converging portion is located between said cabin ceiling and said fuselage.

9. In an airplane having a pressurized compartment subject to being filled with smoke, said pressurized compartment being defined by physical boundaries, and a space enclosed within the outer envelope of the airplane but exposed to ambient air pressure, the improvement which comprises means for conducting the smoke from said pressurized compartment to said enclosed space.

10. An airplane as in claim 9 wherein said means for conducting smoke comprises a nozzle having a converging portion, a throat, and a diverging portion.

11. An airplane as in claim 10 wherein said converging portion is located in said pressurized compartment.

12. An airplane as in claim 11 wherein said diverging portion is located in said enclosed space.

13. An airplane as in claim 12 wherein said throat is located in one of said boundaries of said pressurized compartment.

* * * * *